United States Patent
Gattere et al.

(10) Patent No.: US 11,971,284 B2
(45) Date of Patent: Apr. 30, 2024

(54) METHOD FOR MANUFACTURING A SILICON-BASED CORIOLIS-FORCE-BASED FLOW SENSING DEVICE, CORIOLIS-FORCE-BASED FLOW SENSING DEVICE, AND SYSTEM FOR MEASURING A PROPERTY OF A FLUID

(71) Applicant: STMICROELECTRONICS S.r.l., Agrate Brianza (IT)

(72) Inventors: Gabriele Gattere, Castronno (IT); Francesco Rizzini, Passirano (IT); Luca Guerinoni, Alzano Lombardo (IT); Lorenzo Corso, Ruginello (IT); Domenico Giusti, Caponago (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 98 days.

(21) Appl. No.: 17/204,664

(22) Filed: Mar. 17, 2021

(65) Prior Publication Data
US 2021/0293597 A1  Sep. 23, 2021

(30) Foreign Application Priority Data
Mar. 20, 2020 (IT) .................. 102020000006001

(51) Int. Cl.
*G01F 1/84* (2006.01)
(52) U.S. Cl.
CPC .......... *G01F 1/8472* (2013.01); *G01F 1/8404* (2013.01)
(58) Field of Classification Search
CPC ...................................................... G01F 1/8472
See application file for complete search history.

(56) References Cited

U.S. PATENT DOCUMENTS

| | | | |
|---|---|---|---|
| 6,477,901 B1 * | 11/2002 | Tadigadapa ........... | G01F 1/8404 73/861.352 |
| 7,075,160 B2 | 7/2006 | Partridge et al. | |
| 2004/0188648 A1 | 9/2004 | Xie et al. | |
| 2004/0248344 A1 | 12/2004 | Partridge et al. | |
| 2006/0010964 A1 * | 1/2006 | Sparks .................. | G01N 11/06 73/54.01 |
| 2009/0267166 A1 | 10/2009 | Verheijden et al. | |

OTHER PUBLICATIONS

Sparreboom et al., "Compact Mass Flow Meter Based on a Micro Coriolis Flow Sensor," Micromachines 2013, 4, 22-33.

* cited by examiner

*Primary Examiner* — Kristina M Deherrera
*Assistant Examiner* — Mark A Shabman
(74) *Attorney, Agent, or Firm* — Seed IP Law Group LLP (57) ABSTRACT

Embodiments of a Coriolis-force-based flow sensing device and embodiments of methods for manufacturing embodiments of the Coriolis-force-based flow sensing device, comprising the steps of: forming a driving electrode; forming, on the driving electrode, a first sacrificial region; forming, on the first sacrificial region, a first structural portion with a second sacrificial region buried therein; forming openings for selectively etching the second sacrificial region; forming, within the openings, a porous layer having pores; removing the second sacrificial region through the pores of the porous layer, forming a buried channel; growing, on the porous layer and not within the buried channel, a second structural portion that forms, with the first structural region, a structural body; selectively removing the first sacrificial region thus suspending the structural body on the driving electrode.

20 Claims, 7 Drawing Sheets

METHOD FOR MANUFACTURING A SILICON-BASED CORIOLIS-FORCE-BASED FLOW SENSING DEVICE, CORIOLIS-FORCE-BASED FLOW SENSING DEVICE, AND SYSTEM FOR MEASURING A PROPERTY OF A FLUID

BACKGROUND

Technical Field

The present disclosure relates to a method for manufacturing a Coriolis-force-based flow sensing device, a Coriolis-force-based flow sensing device, and a system for measuring a property of a fluid including the Coriolis-force-based flow sensing device.

Description of the Related Art

Fluid measurement, control and manipulation are very important in many applications. Direct and accurate measurement of mass flow and/or fluid density has been made possible through the development of different types of direct mass flowmeters. One effective device of this kind a gyroscopic mass flow meter, which takes advantage of the Coriolis force in making measurements (shortly named Coriolis flowmeter).

Coriolis flowmeters are indeed one of the most important flow measuring principles of the last decades. A Coriolis flowmeter is based on an accurate measuring principle that is able to measure a plurality of parameters such as mass flow rate, temperature, density and viscosity of the flowing fluid.

Coriolis flowmeters have been manufactured in a number of different shapes and technologies, including metal tubes and silicon (the latter being in the sector of micro-flowmeters). Micro-flowmeters are typically manufactured using the silicon technology, employing MEMS-like process flows, by etching a micro tube structure from a silicon wafer. Such micro-machined silicon-based Coriolis sensor chips allow the application of the Coriolis measuring principle to microfluidic applications, namely for measuring very low flowrates or small masses of fluids.

The functioning principle of a Coriolis flowmeter is summarized herewith.

The Coriolis flowmeter is a sensor based on the Coriolis force which acts on a fluid flow in a vibrating channel. The main advantage is that the Coriolis force is directly proportional to mass flow and independent of temperature, pressure, flow profile and fluid properties. Therefore, a Coriolis type flow sensor includes a vibrating tube, which transfer its vibration to the moving (flowing) mass inside the tube. This mass is forced to change its velocity due to the externally imposed vibration, thus resulting in Coriolis forces that can be detected. The Coriolis force induces a vibration with an amplitude proportional to the mass flow.

Coriolis-based micro-flowmeters, i.e., manufactured in MEMS technology, suffer from high costs and/or low yield and/or low reliability.

BRIEF SUMMARY

The present disclosure provides a method for manufacturing a Coriolis-force-based flow sensing device, a Coriolis-force-based flow sensing device, and a system for measuring a property of a fluid including the Coriolis-force-based flow sensing device, that meet the above discussed needs.

The present disclosure is directed to embodiments of Coriolis-force-based flow sensing devices. For example, in at least one embodiment, a Coriolis-force-based flow sensing device includes a silicon substrate with a surface. An insulating layer on the surface of the substrate and at least one driving electrode is on the insulating layer. A silicon structural body partially overlaps the driving electrode and the structural body has a buried channel.

The present disclosure is directed to methods of manufacturing Coriolis-force-based flow sensing devices. For example, in at least one embodiment, a method includes manufacturing a Coriolis-force-based flow sensing device by forming a first sacrificial region on a driving electrode on an insulating layer of a substrate. Forming a first structural portion on the first sacrificial region. The first structural portion having a second sacrificial region buried therein. A portion of the second sacrificial region at least partially overlaps the driving electrode. Forming at least one aperture through part of the first structural portion. The aperture reaching the second sacrificial region. Forming a porous layer within the aperture. The porous layer having pores dimensioned to allow passage of an etchant configured to selectively remove the second sacrificial region. Forming a buried channel by selectively removing the second sacrificial region through the pores of the porous layer using the etchant. Forming a structural body by forming a second structural portion that combines with the first structural portion. Forming a passing hole lateral to the buried channel. The passing hole reaching the first sacrificial region. Suspending a region of the structural body on the driving electrode by selectively removing the first sacrificial region through the passing hole.

BRIEF DESCRIPTION OF THE SEVERAL VIEWS OF THE DRAWINGS

For a better understanding of the present disclosure, preferred embodiments thereof will now be described purely by way of non-limiting example with reference to the appended drawings, wherein.

DETAILED DESCRIPTION

Figure 1:
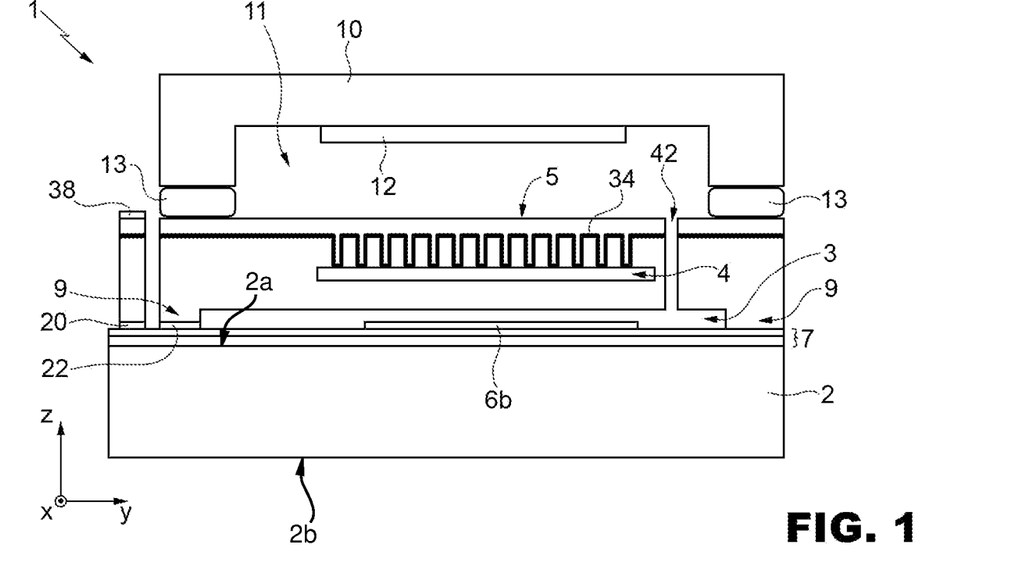
FIG. 1 shows a lateral cross-section view of an embodiment of Coriolis-force-based flow sensing device according to the present disclosure.

FIG. 1 shows a Coriolis-force-based flow sensing device, in particular a Coriolis flowmeter (in the following simply named as "flowmeter"), to be used to measure the mass of a flowing liquid or gas. The flowmeter is identified with reference numeral 1.

FIG. 1 shows the flowmeter in a lateral section view, in a triaxial reference system of axes X, Y and Z. In the following description, the "thickness" is intended measured along the axis Z. The view of FIG. 1 is taken along the section line I-I shown in FIG. 2.

The flowmeter 1 includes a substrate 2, having a first (e.g., top surface) and a second (e.g., bottom surface) 2a, 2b, which is based on the orientation of the flowmeter 1 as shown in FIG. 1; a channel, or tube, 4 formed in (buried in) a silicon body 5 extending over the top surface 2a of the substrate 2; and driving and sensing electrodes 6 (only one driving electrode 6b is exemplarily shown in FIG. 1) over top surface 2a of the substrate 2, in particular between the substrate 2 and a portion of the channel 4. The electrodes 6 are electrically insulated from the substrate 2 by one or more insulating or dielectric layers 7 interposed between the substrate 2 and the electrodes 6.

The silicon body 5 is anchored to the substrate 2 at anchoring regions 9, and is otherwise suspended over the substrate 2, in particular it is suspended where the channel 4 is to be put in vibration during use for driving and sensing operations (forming a freestanding structure). Accordingly, a spacing (chamber) 3 is present between the electrodes 6 and the silicon body 5.

It is noted that the channel 4 is a buried channel manufactured in the silicon body 5; accordingly, during use in order to put the channel 4 in vibration, the driving electrode 6a is polarized in such a way that electrostatic coupling with the silicon body 5 housing the channel 4 is achieved. In other words, the driving electrode 6A is electrostatically coupled to the silicon body 5. In some embodiments, the driving electrode 6a may instead be a sensing electrode 6a is electrostatically coupled to the silicon body 5. With opportune choice of the signals applied to the driving electrodes, the channel 4 is resonated. A twist in the silicon body 5 housing the channel, as a result of liquid flow and its associated Coriolis force, is measured in order to detect the mass flow rate of the gas or liquid.

Detection may be achieved by measuring the variation in the capacitance due to flow and/or the change in the resonant frequency when the channel 4 is filled with fluid/liquid/gas. The driving electrodes electrostatically drive the silicon channel 4 into resonance, and the sensing electrode(s) capacitively senses the frequency and twist motion of the silicon body 5 housing the channel 4. To achieve or improve the electrostatic coupling, the silicon body 5 may be adequately doped during manufacturing, for example with a doping of N-type, in the range $1 \cdot 10^{15} - 1 \cdot 10^{18}$ ions/cm$^3$.

The silicon body 5, when formed of an electrically-conductive material, such as doped silicon, can serve as an electrode that can be capacitively coupled to the driving electrodes, enabling the driving electrodes to electrostatically drive the silicon body 5. However, it is foreseeable that the silicon body 5 could be formed of a nonconductive material, and a separate electrode formed on the silicon body 5, directly facing the driving electrode, for vibrating the channel 4 electrostatically. The sensing electrode can sense the proximity or motion of the silicon body 5 capacitively or electrostatically or even magnetically, or in any other suitable manner capable of sensing the proximity or motion of the silicon body 5.

The channel 4 includes an inlet and an outlet port 14, 16 (shown in FIG. 2), configured to allow fluid circulation within the channel 4.

A cap 10 may also be present above the silicon body 5, coupled to the silicon body 5 through coupling or bonding regions 13. The coupling or bonding regions 13 are manufactured such that fluid-tight sealing is achieved isolating the chamber 11 from an outer environment. The chamber 11 can thus be configured to have a controlled pressure therein. This is to lower the pressure to few millibars where the silicon body 5, with channel 4 buried inside, vibrates during use. Pressure control may be achieved either during manufacturing (i.e., by mounting the cap 10 in a pressure-controlled environment) or by arranging a getter 12 within the chamber 11, and then activating the getter 12. Enclosed the silicon body 5 by the cap 10 allows for vacuum packaging that further improves the performance of the flowmeter 1 by reducing air damping effects.

The chamber 11 is in fluidic connection or fluid communication with the chamber 3, so that the chamber 11 and the chamber 3 are at the same pressure.

Figure 2:
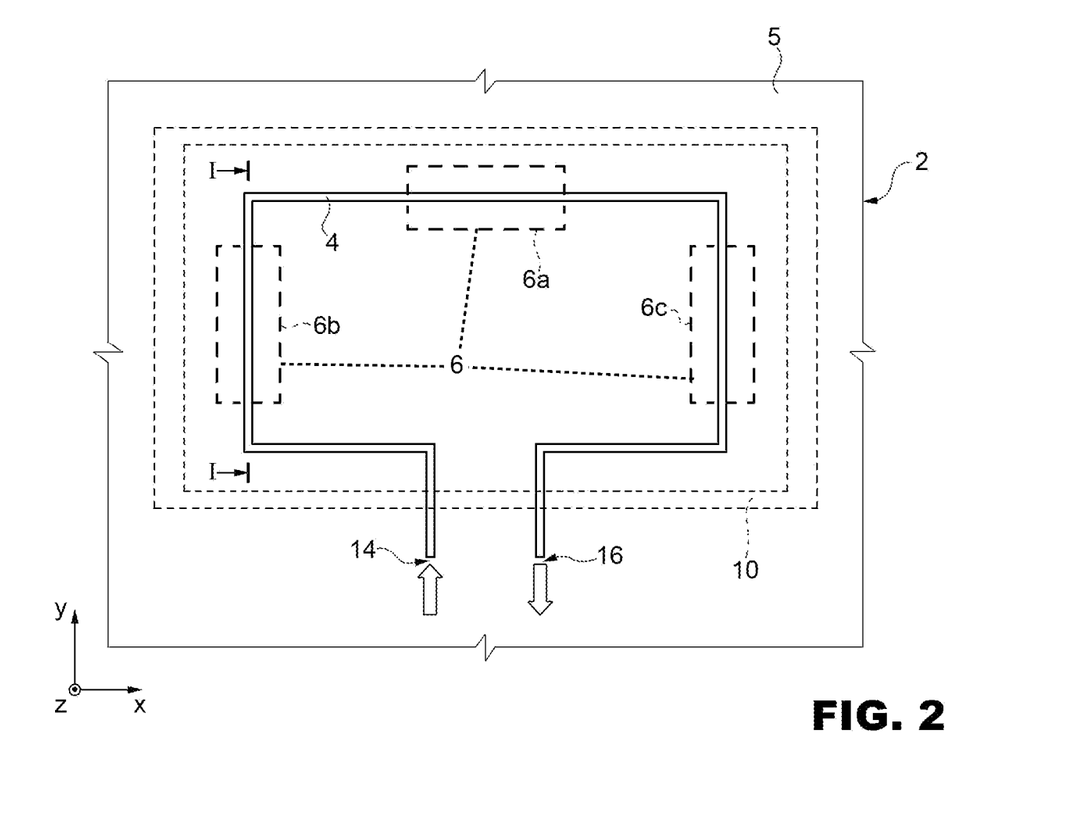
FIG. 2 shows schematically an exemplary layout of a channel of the Coriolis-force-based flow sensing device of FIG. 1, in top-plan view.

FIG. 2 is a schematic top-plan view of the flowmeter 1 of FIG. 1, from which one can appreciate the presence of the inlet port 14, the outlet port 16, one sensing electrode 6a, and two driving electrodes 6b, 6c.

The shape of the channel can be freely chosen at the design stage, and the one shown in FIG. 2 is not limiting the present disclosure.

In FIG. 2, the cap 10 is schematically shown with dashed line. As can be seen, the cap 10 completely surrounds the portions of the channel 4 designed to vibrate (i.e., the freestanding portion of the silicon body 5), and let the input and output ports 14, 16 to be fluidically accessible.

With a fluid/liquid/gas entering the channel 4 through the inlet port 14 and flowing through the channel 4 towards the outlet port 16, the freestanding portion of the silicon body 5 can be vibrated at or near resonance by the driving electrodes 6b, 6c to ascertain certain properties of the fluid, such as mass flow rate and density, using Coriolis force principles. In particular, as the freestanding portion is driven at or near resonance, the sensing electrode 6a senses a twisting motion of the freestanding portion, referred to as the Coriolis effect. The degree to which the freestanding portion deflects during a vibration cycle as a result of the Coriolis effect can be correlated to the mass flow rate of the fluid flowing through the channel 4, while the density of the fluid is proportional to the frequency of vibration at resonance.

The flowmeter 1 can be used within a system for measuring a property of the fluid circulating through the channel 4.

Such system may comprise fluid-recirculating means, fluid moving device, or fluid moving sub-system (e.g., a pump or micro-pump), having a pump outlet fluidically connected to the input port 14 of the flowmeter 1, and a pump inlet, or reservoir, fluidically connected to the output port of the flowmeter 1. The fluid-recirculating means is configured to make a fluid flowing through the channel 4. Of course, in a different design, the flowmeter 1 may have its input and output ports 14, 16 connected to a further channel, to receive the fluid from said further channel in the absence of a pump.

The system may also comprise driving means or driving circuitry (e.g., one or more voltage generators) for biasing the driving electrodes 6b, 6c with respect to the body 5 of the flowmeter 1, to make the body 5 vibrating when the fluid flows through the channel 4.

The system may also comprise sensing means, sensing components, or sensors, for sensing a vibration of the body 5. The sensing means depends upon the type of sensing implemented in the flowmeter 1, being capacitive sensing, magnetic sensing, etc. In case of capacitive sensing, the sensing means may include a set (one or more) of sensing electrodes to detect a capacitance change.

The manufacturing steps of the flowmeter 1 of FIG. 1 are described in detail with reference to FIGS. 3-10.

Figure 3:
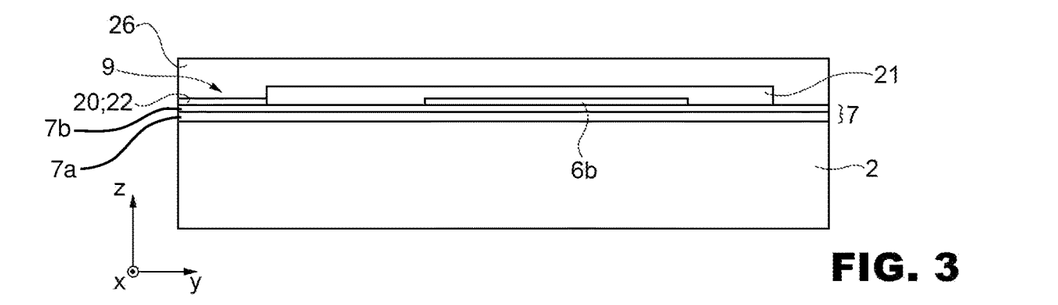
FIGS. 3-9 show manufacturing steps of the Coriolis-force-based flow sensing device of FIG. 1.

With reference to FIG. 3, the silicon substrate 2 is provided. The top surface 2a of the substrate 2 is oxidized to form a silicon oxide layer 7a, and a passivation layer 7b (for example aluminum oxide—$Al_2O_3$) is then formed on the silicon oxide layer 7a, to form the insulating layer 7.

The silicon oxide layer 7a has a thickness of, for example, 3 μm; and the passivation layer 7b has a thickness of, for example, 50 nm.

On the insulating layer 7, a conductive layer 20 is formed, for example of polysilicon or metal, and then shaped to form the sensing and driving electrodes 6 as well as the routing used to bias, during use, the sensing and driving electrodes 6. The conductive layer 20 is also shaped to define pads 22 to be used to bias the silicon body 5, and the corresponding routing.

FIG. 3 shown exemplarily only one electrode 6b.

On the electrodes 6 and the routing, a sacrificial layer 21 is formed, for example of silicon oxide. The sacrificial layer 21 is selectively removed where the anchoring regions 9 are to be formed. In FIG. 3, one anchoring region 9 is made with the insulating layer 7 (in particular, passivation layer 7b) and another anchoring region 9 is made with a portion of the conductive layer 20 designed to form biasing pad 22 for the silicon body 5.

Then, a silicon epitaxial growth is carried out to grow a structural layer 26 on the sacrificial layer 21 and on the exposed insulating layer 7 and pad 22, to form the anchoring regions 9. The structural layer 26 has a thickness in the range 3-10 μm, for example 3 μm.

Figure 4:
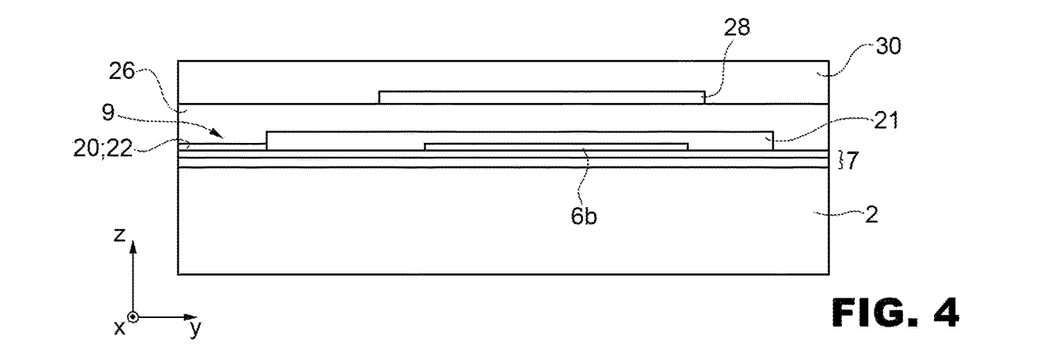

Then, in FIG. 4, a further sacrificial layer 28 is formed on the structural layer 26 and shaped through lithographic and etching steps. The sacrificial layer 28 is, for example, of silicon oxide. As will be apparent from the following description, the sacrificial layer 28 defines the shape of the channel 4. Accordingly, the step of shaping (patterning or etching) the sacrificial layer 28 is made using a proper mask to achieve the desired shape for the channel 4, according to the design of the channel 4.

The, a further epitaxial growth of silicon is carried out on the structural layer 26 and the sacrificial layer 28, forming a further structural layer 30.

A CMP ("Chemical-Mechanical-Polishing") step, or an equivalent planarization step, is carried out on the structural layer 30, for smoothing and planarizing the top surface of the structural layer 30.

Figure 5:
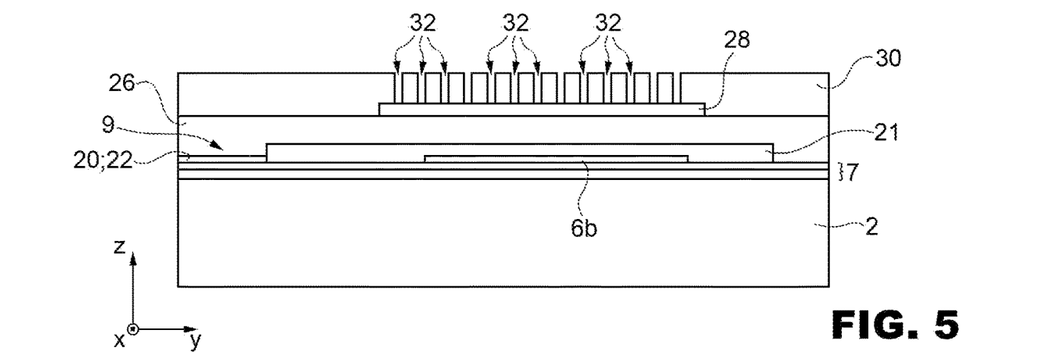

Then, in FIG. 5, a masked etching is carried out to remove selective portions of the structural layer 30 extending above, and aligned to, the sacrificial layer 28, to form a plurality of apertures 32. The apertures 32 extend for the whole thickness of the structural layer 30, reaching and exposing respective regions of the sacrificial layer 28. The apertures 32 will form, as discussed herein and as follows, passages for an etchant solution used to remove the sacrificial layer 28.

Figure 6:
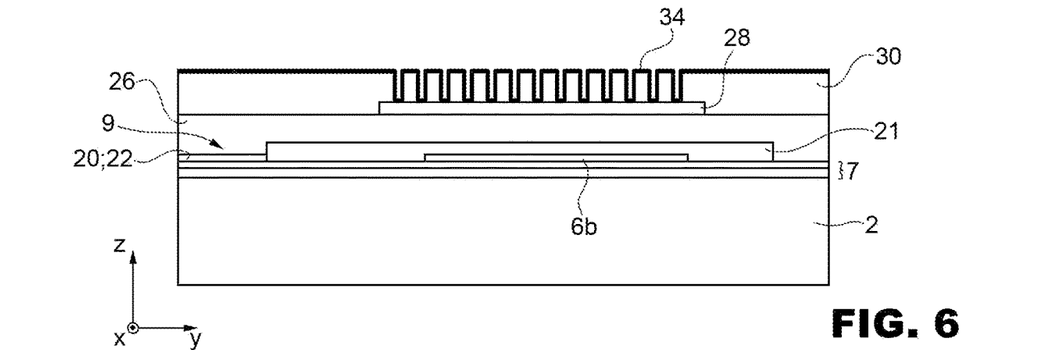

Before removal of the sacrificial layer 28, the step of FIG. 6 is carried out. According to FIG. 6, a porous layer 34 is formed within the apertures 32, to cover the lateral walls of the apertures 32 and the bottom of the apertures 32 (corresponding to the regions of the sacrificial layer 28 exposed through the apertures 32). The porous layer 34 also extends, optionally, on the structural layer 30.

The porous layer 34 may be for example of porous silicon, in particular porous polycrystalline silicon, having holes (pores) with diameters ranging from 1 to 50 nm. The thickness of the porous layer 34 is in the range 80-150 nm. For example, the thickness of the porous layer 34 may be 100 nm.

The porous layer 34 is a low pressure chemical vapor deposition (LPCVD)-deposited polycrystalline silicon film, having pores permeable to hydrofluoric (HF) acid etching or some other suitable wet etching technique. The formation of porous polysilicon is a repeatable one-step low pressure chemical vapor deposition (LPCVD) process. According to an exemplary, non-limiting, embodiment, the deposition conditions are in a tensile-to-compressive transition region, with a process window around 600° C. using a silane source gas, in a deposition environment with a pressure of about 550 mTorr. The thickness of the porous layer 34 is in the range 100-150 nm.

The dimensions of the pores of the porous layer 34 are, in general, chosen so that the etching solution (liquid or gaseous) used to remove the sacrificial layer 28 can penetrate through the pores to reach the sacrificial layer 28. The etching solution is, in an embodiment, based on a hydrofluoric (HF) acid solution.

Figure 7:
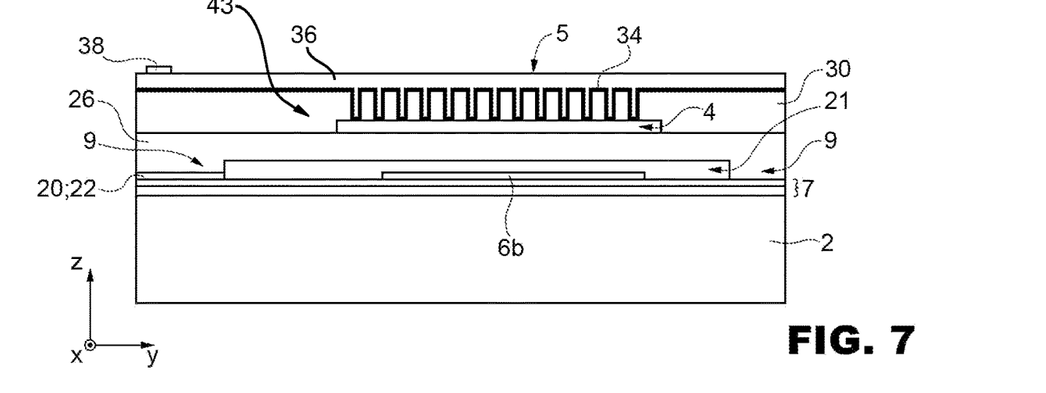

With reference to FIG. 7, the etching step of the sacrificial layer 28 (that, in this exemplary embodiment is of silicon oxide) is carried out with HF (hydrofluoric acid), or buffered HF mixtures (i.e., a buffered oxide etch), or vapor etching techniques using vapor HF. Thus, the channel 4 is formed.

Then, a further epitaxial growth of silicon is carried out on the porous layer 34, to form a further structural layer 36 of silicon, e.g., with a thickness in the range 2-7 μm. It is noted that the epitaxial growth fills the pores of the porous layer 34 and does not causes undesired silicon growth within the channel 4.

One or more conductive pads 38, for allowing external bias of the driving/sensing electrodes, can now be formed on the structural layer 36. One exemplary pad 38 is shown in FIG. 7. Pad are formed by depositing conductive material, e.g., metal such as Aluminum, and by shaping the metal to achieve the desired extensions for the pads. The shaping of the metal may be patterning the metal, etching the metal, or some other combination of shaping techniques.

Figure 8:
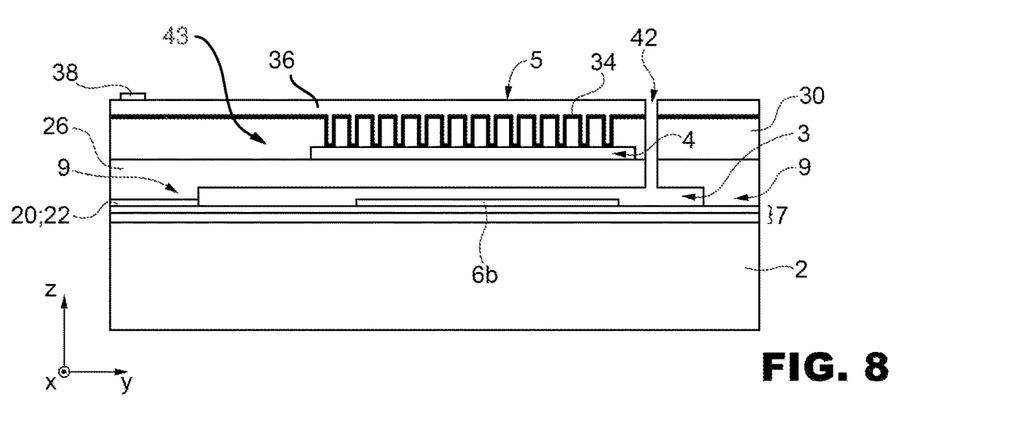

Then, in FIG. 8, at least one trench or aperture 42 is formed through the structural layers 36, 30, 26 and through the porous layer 34, reaching the sacrificial layer 21. The aperture 42 is formed laterally to the channel 4. Even though only one trench 42 is shown in the drawings, one can form more than one trench through the structural layers 36, 30, 26 and through the porous layer 34, reaching the sacrificial layer 21.

An etching step of the sacrificial layer 21 is carried out. In this exemplary embodiment, the sacrificial layer 21 is of silicon oxide, and, therefore, the etching step can be carried out with HF, or buffered HF mixtures (i.e., a buffered oxide etch), or vapor etching techniques using vapor HF. Thus, the chamber 3 is formed. Also, at the same time, a suspended portion 43 of the silicon body 5 is formed.

Figure 9:
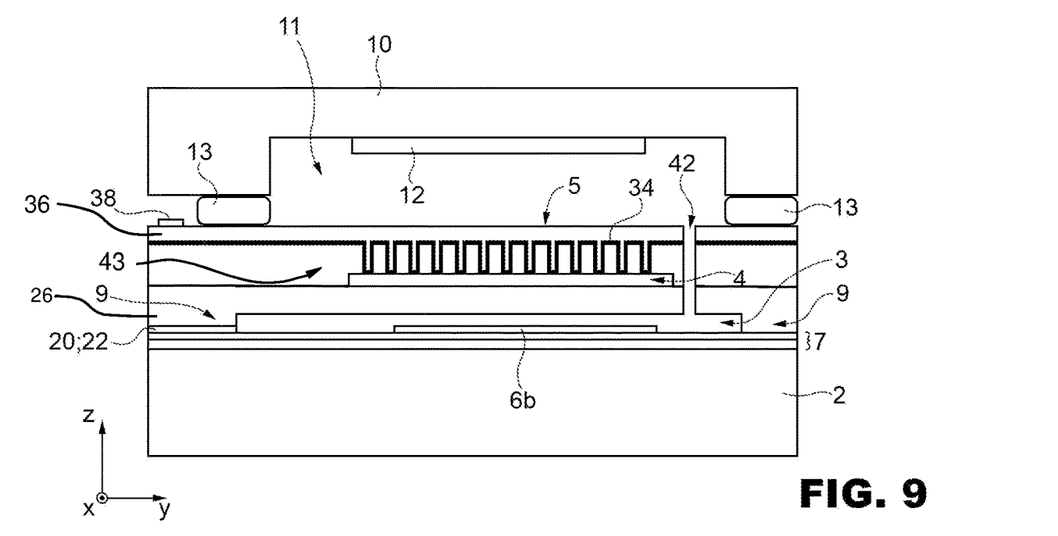

Then, in FIG. 9, the cap 10 is provided and coupled (e.g., bonded) to the structural layer 36 by a bonding technique or a combination of bonding techniques to surround (in top plan view) the suspended portion 43 of the silicon body 5 and the channel 4. The cap 10 is also provided, before bonding, with the getter 12. The steps of forming the cap 10 and the getter 12 are per se known in the art, and therefore not further described.

A further etching step is carried out to open the channel 4 at the regions where inlet and outlet ports 14, 16 are to be formed, by removing selective portions of the structural layers 36, 30, 26 and of the porous layer 34, reaching the insulating layer 7 (in particular, the passivation layer 7b). This same etching step can also be used to electrically isolate the pad 38 from the silicon body 5. The device of FIG. 1 is thus formed.

After the opening of the channel 4 (i.e., formation of inlet and outlet ports 14, 16), a further layer (not shown) can be formed within the channel 4 covering the inner walls of the channel 4 changing the properties of the inner walls of the channel 4. For example, this layer may be designed to act as a barrier to protect the inner walls of the channel 4 against aggressive fluids, or to improve the wettability of the channel 4, or for any other purpose. The further layer may be referred to as a property-changing layer that has improved wettability relative to when the inner walls of the channel 4 are uncovered.

For example, a passivation step of the channel can be carried out. The passivation step is aimed at promoting the growth of a thin silicon oxide layer within the channel 4 (e.g., a thermally grown oxide). According to a further embodiment, an atomic layer of Hafnium dioxide can be formed through a ALD ("Atomic Layer Deposition") process. Other techniques can be used, as apparent to the skilled person.

From what has been described above, the advantages of the present disclosure emerge clearly.

In particular, the process described is highly reliable, industrially applicable on mass production and has reduced costs.

Finally, it is clear that modifications and variations may be made to what has been described and illustrated herein, without thereby departing from the scope of protection of the present disclosure, as defined in the annexed claims.

In particular, the present disclosure has been described with specific reference to a substrate and structural layers made in Silicon. It is apparent that the teaching of the present disclosure is applicable to substrates in different materials, such as Glass, AlN, GaN, and structural layers manufactured accordingly.

According to a further embodiment of the present disclosure, the drive and sense electrodes can be manufactured of differential type, as shown in FIGS. 10-13.

Figure 10:
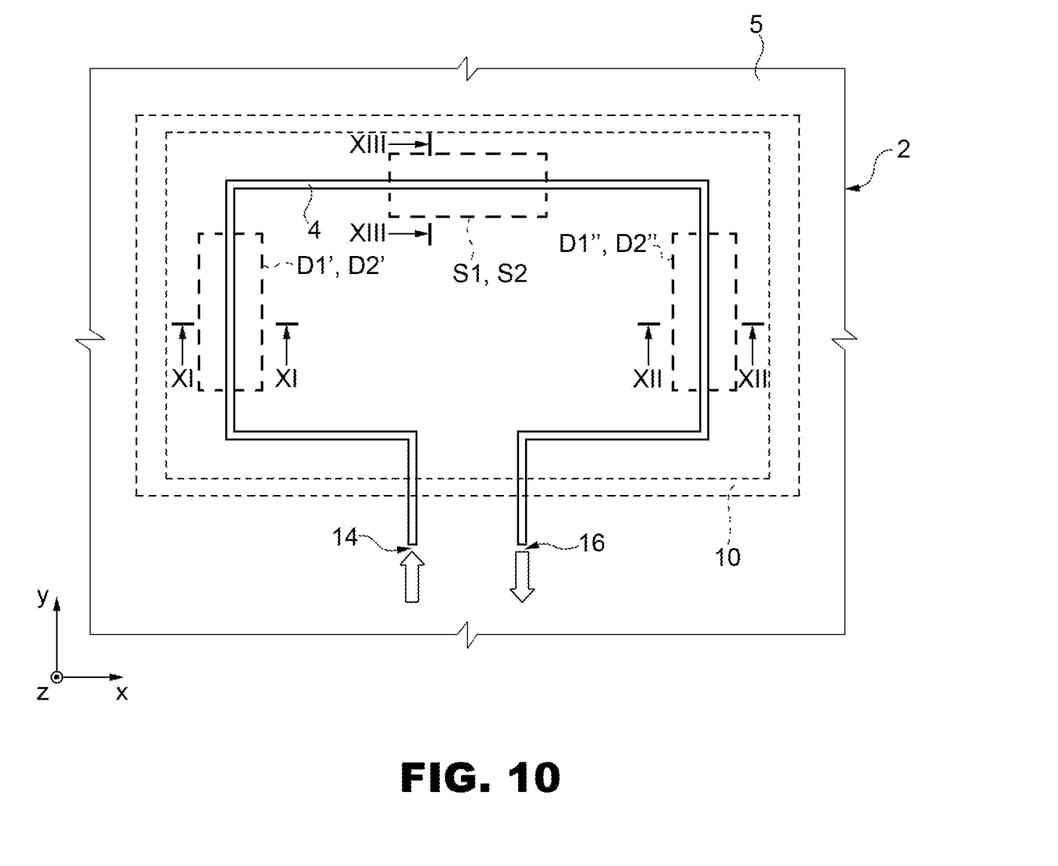
FIG. 10 shows, in top-plan view, a further embodiment of a Coriolis-force-based flow sensing device according to the present disclosure.

FIG. 10 substantially corresponds to FIG. 2, where the drive electrode 6b is replaced by differential electrodes D1'-D2', the drive electrode 6c is replaced by differential electrodes D1"-D2", and the sense electrode 6a is replaced by differential electrodes S1 (S1' and S1") and S2 (S2' and S2").

Figure 11:
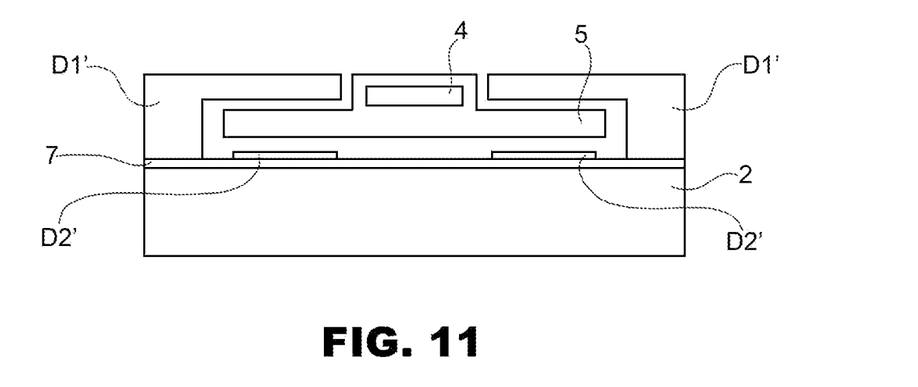
FIGS. 11-13 show respective lateral cross-section views of the Coriolis-force-based flow sensing device of FIG. 10.
Figure 12:
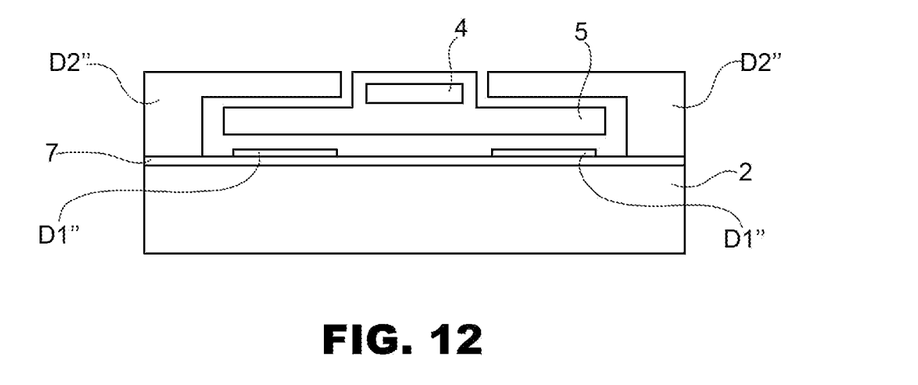
Figure 13:
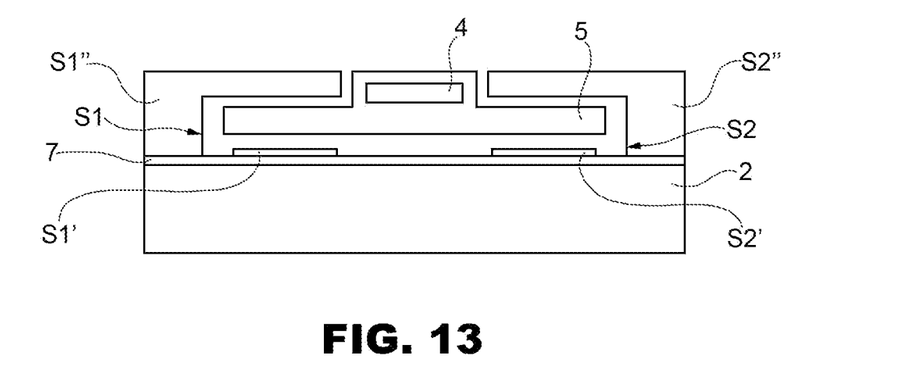

FIGS. 11-13 schematically show a cross sectional view of the drive electrodes 6b, 6c (FIGS. 11 and 12) and of the sense electrode (FIG. 13), where a differential structure is implemented. FIGS. 10-13 are schematic views aimed at showing the arrangement of the differential electrodes, and do not show all the structural features of the device of FIG. 1.

FIG. 11 is taken along the cross section XI-XI of FIG. 10. FIG. 12 is taken along the cross section XII-XII of FIG. 10. FIG. 13 is taken along the cross section XIII-XIII of FIG. 10.

With reference to FIG. 11, a drive electrode D1' and a drive electrode D2' are arranged on opposite parts of the silicon body 5, laterally to the channel 4. By biasing electrodes D1' and D2' with a differential voltage $\Delta V'$, a force is exerted on silicon body 5 at the region of drive electrodes D1' and D2'.

With reference to FIG. 12, a drive electrode D1" and a drive electrode D2" are arranged on opposite parts of the silicon body 5, laterally to the channel 4. By biasing electrodes D1" and D2" with a differential voltage $\Delta V"$, a corresponding force is exerted on silicon body 5 at the region of drive electrodes D1" and D2".

In an embodiment $\Delta V'$ is equal to $\Delta V"$ and the application of the differential voltage is alternated in time so that, during a first time interval, only the drive electrodes D1' and D2' are biased and, during a second time interval (successive to the first time interval) only the drive electrodes D1" and D2" are biased. The process is then repeated. An oscillation (vibration) of the silicon body 5 is thus achieved.

With reference to FIG. 13, the sense electrodes S1 and S2 can sense the vibration of the silicon body 5 by measuring a capacitance change between the silicon body 5 and S1', and between the silicon body 5 and S1", and by measuring a capacitance change between the silicon body 5 and S2' and between the silicon body 5 and S2".

Figure 14:
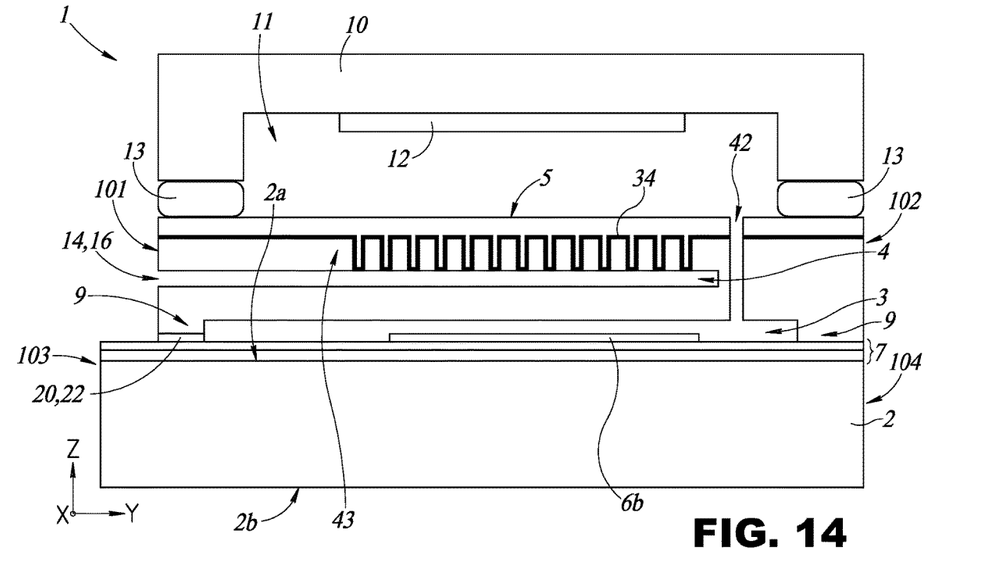
FIG. 14 shows a lateral cross-section view of the embodiment of Coriolis-force-based flow sensing device as shown in FIG. 2 according to the present disclosure.
Figure 15:
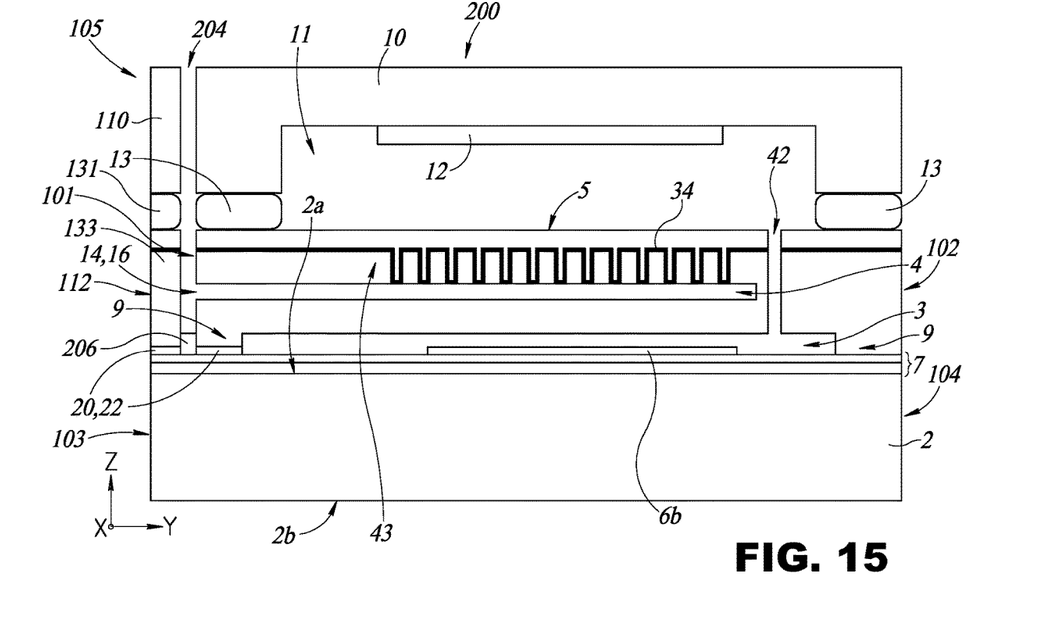
FIG. 15 shows a lateral cross-section view of an alternative embodiment of Coriolis-force-based flow sensing device according to the present disclosure.
Figure 16:
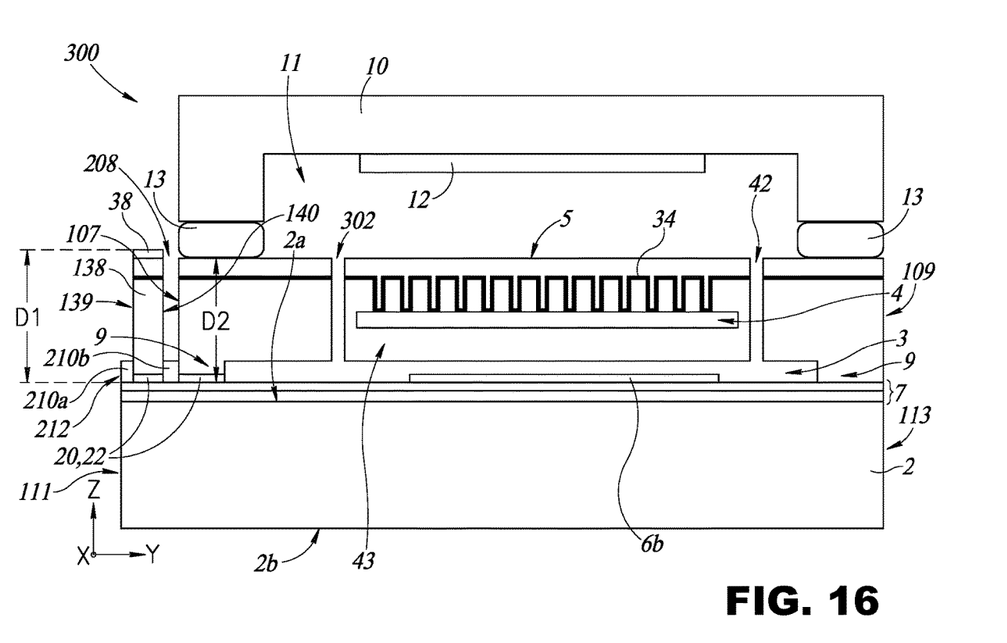
FIG. 16 shows a lateral cross-section view of an alternative embodiment of Coriolis-force-based flow sensing device according to the present disclosure.

FIGS. 14-16 show alternative embodiments of Coriolis-force-based flow sensing devices 200, 300 having the same or similar features to the embodiment of the Coriolis-force-based flow sensing device (or flowmeter) 1 as shown in FIG. 1. The features in FIGS. 14-16 that are the same or similar to the features in FIG. 1 and are represented by the same or similar reference numerals as in FIG. 1. However, different or additional features in the alternative embodiments of the Coriolis-force-based flow sensing devices 200, 300 are represented by different or additional reference numerals. For the sake of simplicity and brevity of the present disclosure, only the different or additional features will be discussed in further detail as follows.

FIG. 14 is a cross-sectional view of the Coriolis-force-based sensing device 1 taken along the channel or tube 4 as shown in FIG. 2. The inlet or outlet port 14, 16 is exposed from a first side surface 101 of the silicon body 5. The first side surface 101 is at the left-hand side of FIG. 14. The silicon body 5 has a second side surface 102 that is opposite to the first side surface 101. The inlet or outlet port 14, 16 is substantially flush or coplanar with the side surface 101 of the silicon body 5. The porous layer 34 has an end that is flush or coplanar with the side surface 101 of the silicon body 5.

The substrate 2 has a third side surface 103 that is spaced outwardly from the side surface 101, and a fourth side surface 104 opposite to the third side surface 103. The fourth side surface 104 is substantially coplanar with the second side surface 102 of the silicon body 5. The third side surface 103 is at the left-hand side of FIG. 14 and the fourth side surface 104 is at the right-hand side of FIG. 14.

FIG. 15 is a cross-sectional view of an alternative embodiment of a Coriolis-force-based sensing device 200 on the substrate 2 and a boundary portion 105 on the substrate 2. The cross-sectional view of the alternative embodiment of the Coriolis-force-based sensing device 200 is taken along a similar cross-section as compared to the cross-sectional view as shown in FIG. 14. The Coriolis-forced-based sensing device 200 is positioned adjacent to the boundary portion 105. An opening 204 extends between the Coriolis-force-based sensing device 200 and the boundary portion 105.

The boundary portion 105 is a portion from another Coriolis-forced-based sensing device that remains after singulating an array of Coriolis-forced based sensing devices on the substrate 2. The boundary portion 105 remains after the singulation process forming the opening 204 between the Coriolis-force-based sensing device 200 and the boundary portion 105. For example, the boundary portion 105 includes a cap portion 110, a bonding region portion 131, and a body portion 133, which has similar layers to those of the Coriolis-forced-based sensing device 200. For example, the cap portion 110 is similar or like to the cap 10, the bonding region portion 131 is similar or like to the bonding region 13, and the body portion 133 includes stacked layers similar or like to the conductive layer 20, the silicon body 5, and the porous layer 34. The bonding region portion 131 of the boundary portion 105 couples the cap portion 110 to the body portion 133.

The boundary portion 105 further includes a side surface 112 that includes side surfaces of the cap portion 110, the bonding region portion 131, and the body portion 133, which are substantially coplanar and flush with each other. The side surface 112 of the boundary portion is substantially flush and coplanar with the third side surface 103 of the substrate 2, which can readily be seen at the left-hand side of FIG. 15.

The opening 204 extends to the inlet or outlet port 14, 16 and is in fluid communication with the inlet or outlet port 14, 16. For example, a liquid or gas may flow into the opening 204 and then into the inlet port 14 successively, or a liquid or gas may flow out of the outlet port 16 and then out of the opening 204 successively. In other words, the opening 204 provides access to and from the inlet port 14 or the outlet port 16, respectively. In some embodiments, there may be separate openings similar to the opening 204 as shown in FIG. 15 that are separately and individually in communication with one or the other of the inlet port 14 or the outlet port 16.

A silicon oxide layer or portion 206 is positioned between the opening 204 and the insulating layer 7, which includes the silicon oxide layer 7a and the passivation layer 7b. The silicon oxide portion 206 covers a portion of the insulating layer 7 and protects the insulating layer 7 from being removed when forming the opening 204 during a singulation or etching process. While a similar or like silicon oxide portion is not shown in FIGS. 1 and 3-9, it will be readily appreciated that this silicon oxide portion 206 may be incorporated and positioned in a similar manner in FIGS. 1 and 3-9 as well as in other alternative embodiments to protect the insulating layer 7 during these singulation and etching processes.

FIG. 16 shows a cross-sectional view of an alternative embodiment a Coriolis-force-based sensing device 300 taken along a cross-sectional line similar to the cross-sectional view of the Coriolis-force-based sensing device 1 as shown in FIG. 1. The Coriolis-force-based sensing device 300 includes a second aperture 302 spaced apart from the first aperture 42. The second aperture 302 is formed laterally to the left of the channel 4 based on the orientation of the Coriolis-forced-based sensing device 300 in FIG. 16. Even though only two apertures 42, 302 are shown in FIG. 16, it can readily be appreciated that more than two trenches may be formed through the structural layers 36, 30, 26 and through the porous layer 34, reaching the sacrificial layer 21. The second aperture 302 has the same or similar purpose as the first trench or aperture 42. Accordingly, the purpose of the second aperture 302 will not be discussed in further detail herein.

The Coriolis-force-based sensing device 300 further includes the pad 38, which is on a pillar of stacked layers 138 including layers similar or like to layers of the silicon body 5, the porous layer 34, and the conductive layer 20. A space 208 is positioned between the silicon body 5 and the pillar of stacked layers 138. The space 208 physically separates the silicon body 5 from the pillar of stacked layers 138.

The Coriolis-force-based sensing device 300 further includes a first silicon oxide portion 210a and a second silicon oxide portion 210b, which are positioned directly adjacent to the pillar of stacked layers 138. The pillar of stacked layers 138 separate the first and second silicon oxide portions 210a, 210b from each other. The silicon oxide portions 210a, 210b are the same or similar to the silicon oxide layer or portion 206 as discussed earlier with respect to the Coriolis-forced-based sensing device 200 as shown in FIG. 15. However, unlike the Coriolis-forced-based sensing device 200 as shown in FIG. 15, the Coriolis-forced-based sensing device 300 has the silicon oxide portions 210a, 210b on the left-hand side and on the right-hand side of the pillar of stacked layers 138 based on the orientation of the Coriolis-forced-based sensing device 300 as shown in FIG. 15. While similar or like silicon oxide portions are not shown in FIGS. 1 and 3-9, it will be readily appreciated that these silicon oxide portions 210a, 210b may be incorporated and positioned in a similar manner in FIGS. 1 and 3-9 as well as in alternative embodiments to protect the insulating layer 7 during these singulation and etching processes.

The pillar of stacked layers 138 includes an exterior side surface 139 and an interior side surface 140 opposite to the exterior side surface 139. The exterior and interior side surfaces 139, 140 are spaced inwardly from a side surface 111 of the substrate 2. The exterior side surface 139 is closer to the side surface 111 of the substrate 2 than the interior side surface 140. The first silicon oxide portion 210a has a side surface 212 that is substantially coplanar with the side surface 111 of the substrate 2. The insulating layers 7 have side surface substantially coplanar and flush with the side surfaces 111, 212 of the substrate 2 and the first silicon oxide portion 210a, respectively, which can readily be seen at the left-hand side of FIG. 16.

The first silicon oxide portion 210a extends from the exterior side surface 139 of the pillar of stacked layers 138 to the side surface 111 of the substrate 2. The second silicon oxide portion 210b is positioned within the space 208 and extends from the interior side surface 140 of the pillar of stacked layers 138 to a side surface 107 of the silicon body 5. The silicon body 5 further includes a side surface 109 opposite to the side surface 107, and the substrate 2 further includes a side surface 113 opposite to the side surface 111. The side surface 109 being substantially flush and coplanar with side surface of the insulating layers 7 and the side surface 113 of the substrate 2, respectively, which can readily be seen at the right-hand side of FIG. 16.

The pillar of stacked layers 138 has a first dimension D1 that extends from a surface of the insulating layer 7 to an exposed surface of the pad 38, which faces away from the insulating layer 7. The silicon body 5 and the conductive layer 20 on which a portion of the silicon body 5 is on has a second dimension D2 that extends from the insulating layer to a surface of the silicon body 5 facing away from the insulating layer 7. The first dimension D1 is greater than the second dimension D2.

The contact pad 22 of the conductive layer 20 of the pillar of stacked layers 138 is in electrical communication with the driving electrodes 6b, 6c and biases the driving electrodes 6b, 6c such that driving electrodes 6b, 6c electrostatically drive the silicon channel 4 into resonance. The contact pad 22 of the conductive layer 20 on which the silicon body 5 is present is in electrical communication with the silicon body 5 and electrically biases the silicon body 5. For example, when the silicon body 5 is deflected or moved utilizing the driving electrodes 6b, 6c moving a fluid through the channel 4, a deflection or movement is detected by the sensing electrode 6a. The side surfaces 101, 102, 103, 104, 107, 109, 111, 113 may be sidewalls, walls, or some other type of surface. The apertures 42, 302 may be trenches, openings, through holes, holes, or some other type of space extending through the silicon body 5. The exterior and interior side surfaces 139, 140 may be sidewalls, walls, or some other type of surface.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Coriolis-force-based flow sensing device, comprising:
    a silicon substrate;
    an insulating layer on a surface of the substrate;
    at least one driving electrode on the insulating layer;
    a silicon structural body partially overlapping the driving electrode, the silicon structural body having a buried channel;
    a porous polycrystalline layer of the silicon structural body at least partially delimiting the buried channel, and the porous polycrystalline layer including pores permeable to an etching fluid; and
    a chamber between the silicon structural body and the substrate, the at least one driving electrode being in the chamber.

2. The device of claim 1 wherein the driving electrode and the silicon structural body are coupled to generate an electrostatic force, during use, to vibrate the silicon structural body.

3. The device of claim 2, further comprising a sensing electrode on the insulating layer, the sensing electrode being coplanar with the driving electrode, the silicon structural body at least partially overlapping the sensing electrode, the silicon structural body capacitively coupled to the sensing electrode and configured during use, to sense a vibration of the silicon structural body.

4. The device of claim 1, wherein the buried channel further comprises a fluid-input port and a fluid-output port, configured to let in and, respectively, let out a fluid having a property to be measured.

5. The device of claim 1, wherein the pores of the porous polycrystalline layer include pores with diameters ranging from 1 to 50 nanometers (nm).

6. The device of claim 5, wherein:
    the silicon structural body further comprises a first silicon structural layer, a second silicon structural layer, and a third silicon structural layer;
    the first silicon structural layer is on the insulating layer;
    the second silicon structural layer is on the first silicon structural layer;
    the porous polycrystalline layer is on the second silicon structural layer and is between the second silicon structural layer and the third silicon structural layer; and
    the third silicon structural layer is on the porous polycrystalline layer.

7. A system for measuring a property of a fluid, comprising:
    a Coriolis-force-based flow sensing device that includes:
        a substrate;
        an insulating layer on a surface of the substrate;
        at least one driving electrode on the insulating layer,
        a structural body partially overlapping the driving electrode, the structural body having a buried channel, the buried channel having a first side and a second side opposite to the first side, the first side of the buried channel being closer to the substrate than the second side of the buried channel, the driving electrode and the structural body being coupled together, the structural body forming a chamber between the buried channel and the substrate, the driving electrode being in the chamber;
        a porous layer that partially delimits the second side of the buried channel;
        a fluid-input port and a fluid-output port in fluid communication with the buried channel;
    a fluid-recirculating device fluidically connected to the fluid-input port and the fluid-output port, the fluid-recirculating device configured to cause a fluid to flow through the buried channel;
    driving circuitry configured to bias the driving electrode with respect to the structural body to vibrate the structural body when the fluid flows through the buried channel; and
    a sensor configured to sense a vibration of the structural body.

8. The system of claim 7, further comprising a sensing electrode on the insulating layer, the sensing electrode being coplanar with the driving electrode, the structural body at least partially overlapping the sensing electrode, the structural body capacitively coupled to the sensing electrode so that, during use, a vibration of the structural body can be sensed.

9. The system of claim 7, wherein the driving electrode and the structural body are coupled to generate an electrostatic force, during use, to vibrate the structural body.

10. The system of claim 9, further comprising a sensing electrode on the insulating layer, the sensing electrode being coplanar with the driving electrode, the structural body at least partially overlapping the sensing electrode, the structural body capacitively coupled to the sensing electrode so that, during use, a vibration of the structural body can be sensed.

11. The system of claim 7, wherein the buried channel further includes the fluid-input port and the fluid-output port, and the fluid-input port and the fluid-output port are configured to let in and, respectively, let out a fluid having a property to be measured.

12. The system of claim 7, wherein the porous layer includes pores permeable to an etching fluid.

13. A Coriolis-force-based flow sensing device, comprising:
    a substrate including a first surface;
    an insulating layer on the first surface of the substrate;
    at least one driving electrode on the insulating layer; and
    a structural body including:

a second surface opposite to a third surface, the third surface facing the first surface of the substrate;

a suspended portion that overlaps and is suspended over the driving electrode;

a buried channel within the suspended portion, the buried channel being between the second surface and the third surface;

a first structural layer on the insulating layer;

a second structural layer on the first structural layer, the second structural layer including a plurality of apertures that extend through the second structural layer; and a porous layer on the second structural layer and in the plurality of apertures, the porous layer at least partially delimiting the buried channel, and the porous layer including pores permeable to an etching fluid; and a chamber in the structural body at the third surface, the chamber being between the structural body and the first surface of the substrate, the at least one driving electrode being in the chamber.

14. The device of claim 13, wherein the pores of the porous layer include pores with diameters ranging from 1 to 50 nanometers (nm).

15. The device of claim 13 wherein the suspended portion of the structural body includes the first structural layer, the second structural layer, the porous layer, and a third structural layer.

16. The device of claim 15, wherein the first structural layer, the second structural layer, the porous layer, and the third structural layer are silicon-based layers.

17. The device of claim 13, wherein the buried channel is delimited by the first structural layer and the second structural layer.

18. The device of claim 17, wherein the at least one driving electrode is within the chamber.

19. The device of claim 13, further comprising a chamber between the suspended portion and the insulating layer.

20. The device of claim 13, wherein the buried channel further comprises a fluid-input port and a fluid-output port, configured to let in and, respectively, let out a fluid having a property to be measured.

* * * * *